United States Patent
Marchini et al.

(10) Patent No.: US 9,738,044 B2
(45) Date of Patent: Aug. 22, 2017

(54) PROCESS AND APPARATUS FOR MANUFACTURING TYRES

(71) Applicant: PIRELLI TYRE S.P.A., Milan (IT)

(72) Inventors: Maurizio Marchini, Milan (IT); Gianni Mancini, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 14/651,126

(22) PCT Filed: Dec. 13, 2013

(86) PCT No.: PCT/IB2013/060934
§ 371 (c)(1),
(2) Date: Jun. 10, 2015

(87) PCT Pub. No.: WO2014/097100
PCT Pub. Date: Jun. 26, 2014

(65) Prior Publication Data
US 2015/0314543 A1     Nov. 5, 2015

Related U.S. Application Data

(60) Provisional application No. 61/746,404, filed on Dec. 27, 2012.

(30) Foreign Application Priority Data

Dec. 17, 2012  (IT) .............. MI2012A2148

(51) Int. Cl.
*B29D 30/24*  (2006.01)
*B29D 30/30*  (2006.01)
*B29D 30/26*  (2006.01)

(52) U.S. Cl.
CPC .......... *B29D 30/24* (2013.01); *B29D 30/244* (2013.01); *B29D 30/30* (2013.01); *B29D 30/3042* (2013.01); *B29D 2030/2664* (2013.01)

(58) Field of Classification Search
CPC ...... B29D 30/20; B29D 30/24; B29D 30/244; B29D 30/3007; B29D 2030/2664;
(Continued)

(56) References Cited

U.S. PATENT DOCUMENTS 2,979,110 A  *  4/1961  Henley ................. B29D 30/24
                                                    156/415
3,932,256 A  *  1/1976  Touchette ............. B29D 30/24
                                                    156/133
(Continued)

FOREIGN PATENT DOCUMENTS

DE            3907123   *  9/1990  ............ B29D 30/26
DE    10 2009 025 759      11/2010
(Continued)

OTHER PUBLICATIONS

Machine generated English language translation of EP 1745920 (original document dated Jul. 2005).*
(Continued)

*Primary Examiner* — Martin Rogers
(74) *Attorney, Agent, or Firm* — Finnegan, Henderson, Farabow, Garrett & Dunner, L.L.P.

(57) ABSTRACT

A process for building tyres provides for building a carcass sleeve around a forming drum having an application diameter and two lateral half-portions axially moveable relative to each other. The carcass sleeve includes at least one carcass ply coaxially engaged around each of the axially opposite end flaps thereof to an annular anchoring structure defining a fitting diameter smaller than the application diameter. The building of the carcass sleeve includes: applying and stopping a leading end of a semi-finished product in the form of a continuous strip cut to size against a continuous surface of the forming drum; winding the semi-finished product in the form of a continuous strip cut to size circumferentially around the forming drum; and joining a trailing end of the
(Continued)

semi-finished product to the leading end at said continuous surface. The continuous surface is extended only partly around the forming drum. The semi-finished product, except for the leading end and the trailing end, is laid against a discontinuous circumferential surface of the forming drum adjacent to the continuous surface and belonging to the two lateral half-portions.

14 Claims, 6 Drawing Sheets

(58) Field of Classification Search
CPC .. B29D 2030/2652; B29D 2030/26529; B29D 2030/2529
See application file for complete search history.

(56) References Cited

U.S. PATENT DOCUMENTS

| | | | | |
|---|---|---|---|---|
| 4,210,482 | A * | 7/1980 | Collins | B29D 30/242 |
| | | | | 156/415 |
| 5,268,057 | A * | 12/1993 | Nojiri | B29D 30/245 |
| | | | | 156/415 |
| 5,490,897 | A * | 2/1996 | Miyanaga | B29D 30/245 |
| | | | | 156/415 |
| 2006/0042740 | A1 * | 3/2006 | Takahashi | B29D 30/3007 |
| | | | | 152/510 |
| 2009/0139660 | A1 | 6/2009 | Baldoni et al. | |
| 2009/0151873 | A1 * | 6/2009 | Pinto | B29D 30/246 |
| | | | | 156/416 |
| 2009/0289143 | A1 | 11/2009 | Tanaka et al. | |
| 2010/0024959 | A1 * | 2/2010 | Mancini | B29D 30/245 |
| | | | | 156/117 |
| 2011/0072664 | A1 | 3/2011 | Marchini et al. | |

FOREIGN PATENT DOCUMENTS

| | | | | |
|---|---|---|---|---|
| EP | 0206693 | * | 12/1986 | ............. B29D 30/32 |
| EP | 1745920 | * | 7/2006 | ............. B29D 30/32 |
| EP | 2 062 723 | | 5/2009 | |
| GB | 1113622 | * | 5/1968 | ........... B29D 30/245 |
| JP | 07-80963 | * | 3/1995 | ............. B29D 30/30 |
| WO | WO 2008/099236 | | 8/2008 | |
| WO | WO 2009/144753 | | 12/2009 | |

OTHER PUBLICATIONS

Machine generated English language translation of JP 07-80963 (original document dated Mar. 1995).*
Machine generated English language translation of DE 3907123 (original document dated Sep. 1990).*
International Search Report from the European Patent Office for International Application No. PCT/IB2013/060934, mailing date Mar. 3, 2014.
Written Opinion of the International Searching Authority from the European Patent Office for International Application PCT/IB2013/060934, mailing date Mar. 3, 2014.

* cited by examiner

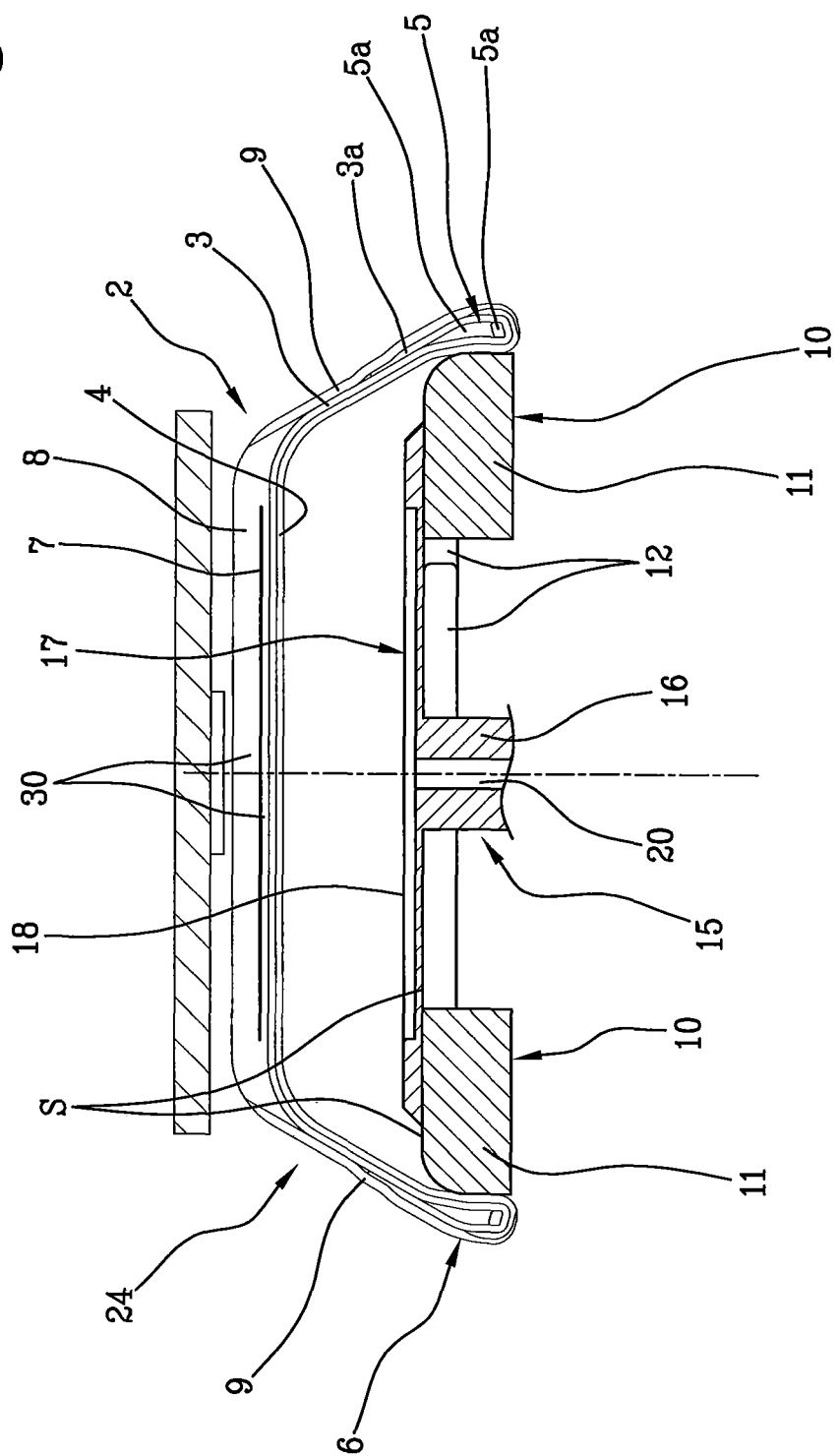

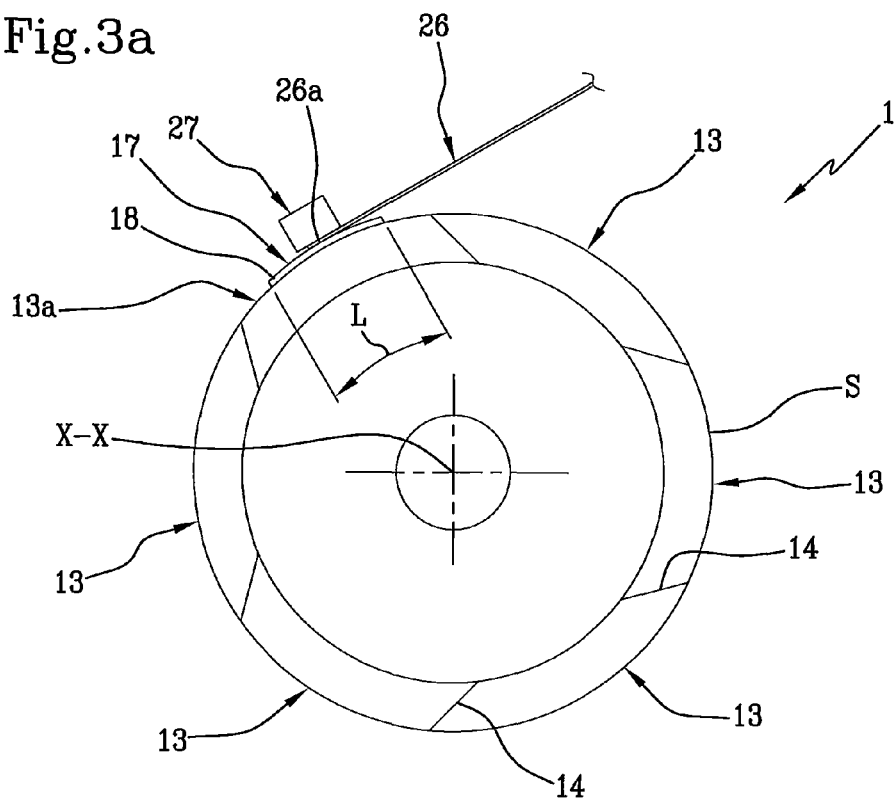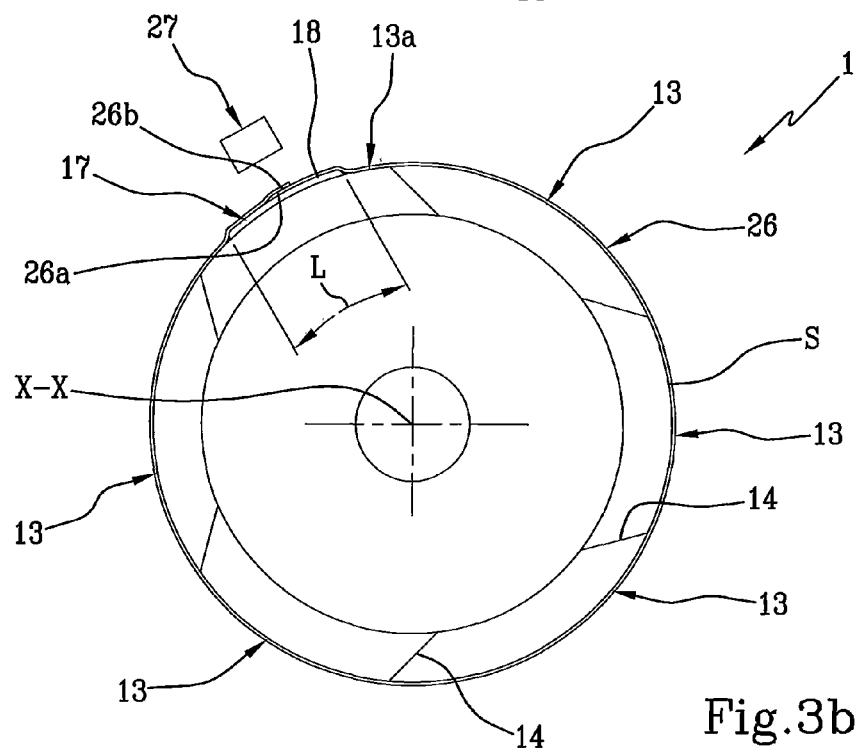

PROCESS AND APPARATUS FOR MANUFACTURING TYRES

CROSS REFEERENE TO RELATED APPLICATIONS

This application is a national phase application based on PCT/IB2013/060934, filed Dec. 13, 2013, and claims the priority of Italian Patent Application No. MI2012A002148, filed Dec. 17, 2012, and the benefit of U.S. Provisional Application No. 61/746,404, filed Dec. 27, 2012, the content of each application being incorporated herein by reference.

BACKGROUND OF THE INVENTION

Field of the Invention

The present invention has as object a process and an apparatus for manufacturing tyres. More particularly, the invention is intended for the process and equipment used for building the green tyre, to be subsequently subjected to a moulding and curing cycle for the obtainment of the final product.

Description of the Related Art

A tyre for vehicle wheels generally comprises a carcass structure comprising at least one carcass ply having respectively opposite end flaps engaged with respective annular anchoring structures, normally termed "bead cores", integrated in the zones generally identified with the name of "beads", having an internal diameter substantially corresponding to a so-called "fitting diameter" of the tyre on a respective mounting rim. In radially external position relative to the carcass structure, a belt structure is associated comprising one or more belt layers, situated in radial superimposition with respect to each other and with respect to the carcass ply, having textile or metallic reinforcement cords with cross orientation and/or substantially parallel to the circumferential extension direction of the tyre. In radially external position relative to the belt structure, a tread band is applied, also made of elastomeric material like other semi-finished products constituting the tyre. Between the tread band and the belt structure, a so-called "underlayer" can be interposed, made of elastomeric material with properties suitable for ensuring a stabile joining of the tread band itself. On the lateral surfaces of the carcass structure, each extending from one of the lateral edges of the tread band up to the respective annular anchoring structure to the beads, respective sidewalls made of elastomeric material are also applied.

By "component made of elastomeric material" of the tyre, it is intended any component of the tyre made of elastomeric material and not reinforced with wires or cords (e.g. tread band, sidewalls, liner, under-liner, fillers in the bead area, sidewall inserts in the self-supporting tyres, anti-abrasive inserts, etc.), or a portion thereof, or the set formed by two or more of the aforesaid components or portions thereof.

It must be specified that, with the term "elastomeric material" it is intended to indicate a composition comprising at least one elastomeric polymer and at least one reinforcement filler. Preferably, such composition further comprises additives such as, for example, a cross-linking agent and/or a plasticisation agent. Due to the presence of the cross-linking agent, through heating such material can be cross-linked, so as to form the final manufactured product.

By continuous surface relative to a forming drum, it is intended a surface without interruption or in which possible openings (such as holes or grooves) have size such that the elastomeric material of the semi-finished product that is rested thereon substantially does not penetrate them. The possible openings each have for example an area less than or equal to about 300 $mm^2$ (e.g. groove with axial extension of about 150 mm for about 2 mm width) and the set of the openings overall have an area smaller than or equal to about 20%, preferably smaller than or equal to about 15% of the total area of said continuous surface.

The document WO 2008/099236, on behalf of the same Applicant, illustrates a process and an apparatus for manufacturing tyres in which a carcass sleeve is formed around an external surface of a forming drum, according to an application diameter greater than the fitting diameter of the tyre. For such purpose, one or more dispensers feed at least one continuous elongated element made of elastomeric material while the forming drum is rotated around its geometric axis, so as to form the liner on an external surface and on support surfaces of the forming drum. Application members sequentially apply a plurality of strip-like elements transversely arranged with respect to the circumferential extension of the external surface, while the forming drum is driven in rotation according to a step-by-step gait, in order to form a carcass ply. Around each of the end flaps of the carcass ply, an annular anchoring structure is coaxially engaged, defining the fitting diameter. An external sleeve comprising a belt structure associated with a tread band is arranged in a coaxially centred position around the carcass sleeve applied on the forming drum. The forming drum comprises a central section and two half-parts axially moveable with respect to the central section. Through mutual axial approaching of the two half-parts, the same carcass sleeve is shaped according to a toroidal configuration to determine the application thereof against a radially internal surface of the external sleeve, according to a "process of building in a single step" or "unistage process".

SUMMARY OF THE INVENTION

In such technical field, the Applicant has perceived the need to make the process of building tyres in a single step more flexible, at the same time maintaining unchanged the structural and performance quality of the produced tyres.

In particular, the Applicant has perceived the need to allow the building and ensure the structural quality of the tyres through a "unistage" process starting from semi-finished products of conventional type in form of a continuous strip, i.e. already having the correct width and previously cut according to the circumferential extension of the external surface of the forming drum, that is substantially integral semi-finished products that were previously made and stored for use.

More particularly, the Applicant has set the objective of obtaining carcass sleeves built in a conventional manner, i.e. starting from the abovementioned conventional semi-finished products wound and joined on the forming drum. These will subsequently be toroidally-shaped on the same forming drum.

The Applicant has observed that the forming drums of the type described in WO 2008/099236, used for depositing the elementary semi-finished products that form the components of the carcass sleeves (for example the continuous elongated element wound in turns which forms the liner or the strip-like elements brought close together to form the carcass ply) and for the subsequent toroidal shaping of said carcass sleeves, are not adapted to correctly receive the abovementioned integral semi-finished products in form of continuous strip cut to size.

The Applicant has indeed found that the central section of the aforesaid forming drums has a greater diameter than that of the two lateral half-parts (in order to allow the axial sliding of the two lateral half-parts) and is extended along the entire circumferential perimeter of the forming drum itself (in order to supply a continuous support to each of the elementary semi-finished products). This causes a circumferential extension of the semi-finished product in form of a continuous strip wound around the drum that differs between the central portion thereof and the lateral edges thereof, such to make it difficult or impossible to correctly join the opposite ends thereof. The Applicant has indeed verified that the difference of diameter of the forming drum involves a circumferential extension that differs between the central portion and the lateral edges of the continuous strip (up to 10 mm-20 mm) such to not allow a correct approaching of the ends along the axial width thereof and such to render impossible any form of automation of the deposition and, above all, of the execution of the joint. More particularly, the Applicant has perceived the need to ensure that the opposite ends of the continuous strip perfectly mate after the winding in order to form a correct, safe and repeatable joint.

The Applicant has perceived that such result can be obtained by limiting the difference between the circumferential extension of the forming drum at an axially central zone thereof and the circumferential extension of the lateral zones thereof.

Finally, the Applicant has found that such result can be obtained by providing, for the forming drum, a continuous surface with circumferentially limited size, sufficient to allow the application of the leading end and the trailing end of the semi-finished product in form of continuous strip cut to size and to allow the pressing of said superimposed ends, while the remaining circumferential portion of the semi-finished product wound on the drum is laid on a central portion of the two lateral half-parts. The abovementioned continuous surface is therefore dedicated to receive and retain the leading end and to facilitate the joining of the leading end with the trailing end upon each building of a tyre.

More particularly, according to a first aspect, the present invention relates to a process for manufacturing tyres comprising building a carcass sleeve around a forming drum having an application diameter and two lateral half-portions axially moveable relative to each other, said carcass sleeve comprising at least one carcass ply coaxially engaged around each of the axially opposite end flaps thereof to an annular anchoring structure defining a fitting diameter smaller than the application diameter.

Preferably the building of said carcass sleeve comprises applying and stopping a leading end of a semi-finished product in form of continuous strip cut to size against a continuous surface of the forming drum.

Preferably, said continuous surface is extended only partly around the forming drum.

Preferably the building of said carcass sleeve comprises winding the semi-finished product in form of continuous strip cut to size circumferentially around the forming drum.

Preferably, winding the semi-finished product comprises laying said semi-finished product, except for the leading end, against a discontinuous circumferential surface of the forming drum adjacent to the continuous surface and belonging to the two lateral half-portions.

Preferably the building of said carcass sleeve comprises joining a trailing end of said semi-finished product to the leading end at said continuous surface.

In accordance with a second aspect, the present invention relates to an apparatus for manufacturing tyres comprising a forming drum having an application diameter.

Preferably the apparatus comprises devices for building a carcass sleeve comprising at least one carcass ply and a pair of annular anchoring structures defining a fitting diameter smaller than the application diameter.

Preferably the forming drum comprises a central sector axially fixed and having a radially peripheral continuous surface adapted to allow joining a leading end and a trailing end of a semi-finished product of said carcass sleeve, said semi-finished product being in form of a continuous strip, cut to size and wound on said forming drum.

Preferably the forming drum comprises two lateral half-portions axially moveable away or approaching each other and relative to said central sector.

Preferably the continuous surface of said central sector is extended only partly around the forming drum.

The Applicant deems that the process and the apparatus according to the invention allow obtaining high-quality, high-performance tyres with carcass structures built by semi-finished products of conventional type in plants that actuate a building of "unistage" type.

More particularly, the Applicant deems that the process and the apparatus according to the invention ensure the obtainment of uniform performance and geometric characteristics along the entire circumferential extension of the tyre and, in particular, of the carcass structure.

In particular, the Applicant deems that, through the illustrated solution, one is able to obtain a precise and safe joint, such to allow the toroidal shaping of the carcass structure (still in sleeve form) directly on the forming drum without any risk of breakage or formation of local weakening.

The Applicant has verified that the joining thus obtained substantially does not leave any significant trace after the subsequent operations of moulding and curing.

The Applicant deems that this is due to the fact that the semi-finished products that are wound and joined have a circumferential extension (and possibly a circumferential elongation due to a kind of stretch during deposition) that is uniform along the entire axial width thereof. This characteristic is obtained due to the fact that the radially peripheral surface of the forming drum has the same peripheral diameter, except only for a portion limited to the continuous surface of the drum on which the joint is made.

Indeed, the semi-finished product substantially rests for its entire circumferential extension on the two lateral half-portions with a constant diameter along the axial width. The diameter only changes at the continuous surface, moving along the width of the forming drum, due to the presence of the abovementioned continuous surface. However, since said continuous surface has a limited circumferential extension, the difference of the overall circumferential extension between the centre and the edges of the drum and therefore of the semi-finished product wound on the drum itself is negligible.

The semi-finished product that is wound on the forming drum has full width, i.e. already before being wound it has the width necessary to form the respective component of the tyre. Therefore, it does not require that the radially outer portion, on which it is laid, be a substantially continuous surface for the entire circumferential extension of the drum; rather, it is sufficient that it provide support zones. It follows that the forming drum can be manufactured with less material, it is lighter and easily transportable and its cost of manufacturing and cost of the devices adapted to transport it are less than those of a forming drum which performs a process of "unistage" building as illustrated for example in WO 2008/099236.

The present invention, in at least one of the aforesaid aspects, can have one or more of the preferred characteristics which are described hereinbelow.

Preferably the discontinuous circumferential surface is an axially central portion of the two lateral half-portions. The discontinuities (openings or passages) of the axially central portion of the two lateral half-portions provide the space necessary for the mutual engagement of said two half-portions and their relative axial movement, as will be clear in the description of their structure hereinbelow.

Preferably after the winding, the semi-finished product laid against the forming drum has a difference of circumferential extension between a central portion thereof and lateral portions thereof smaller than about 2 mm. Still more preferably, this is smaller than about 1 mm. Such limited difference allows making the end edges of the semi-finished product mate, in a manner sufficiently precise to ensure the correct formation of the joint. Preferably after the winding, the leading end and the trailing end of the semi-finished product laid against the forming drum have end edges thereof substantially parallel. In this manner, a minimal superimposition will suffice for obtaining a correct joint. In addition, if the edge of the trailing end is cut oblique, it is perfectly superimposed on the edge of the leading end, it too cut oblique in a manner complementary to the trailing end, already laid on the forming drum.

Preferably stopping the leading end of the semi-finished product comprises: suctioning through at least one suctioning opening terminating on the continuous surface. The suctioning allows blocking the leading end in a safe manner without damaging it.

Preferably the process comprises: pressing the trailing end against the leading end at the continuous surface. The pressure is correctly exerted due to the contrast action of the continuous surface and such pressure contributes to the obtainment of a correct and safe joint.

Preferably the process comprises: exerting a substantially uniform pressure along the entire axial extension of the trailing end and the leading end. In this manner, possible breakage zones are not created along the joint.

According to one embodiment during an application of said at least one carcass ply on the forming drum, the end flaps of said at least one carcass ply are supported on respective support surfaces extending on the continuation of the two lateral half-portions of the forming drum.

Preferably the process further comprises: removing the support surfaces before turning up each of the axially opposite end flaps of the carcass ply around the respective annular anchoring structure. The removal of the support surfaces, which only serves in a specific step of the process, allows more easily operating on the carcass sleeve mounted on the forming drum, in order to perform other processes and/or more easily transport the forming drum.

According to one embodiment, for the engagement around each of the axially opposite end flaps of the carcass ply, each of the annular anchoring structures is brought close against a side of a respective lateral half-portion of the forming drum against which the ends of the carcass ply were previously folded. In this manner, it is obtained that the fitting diameter (which substantially corresponds to the diameter of the annular anchoring structures) is smaller than the application diameter (which corresponds to the external diameter of the forming drum).

Preferably it is provided to position an external sleeve comprising at least one belt structure in a coaxially centred position around the carcass sleeve built on the forming drum.

Preferably it is provided to shape the carcass sleeve according to a toroidal configuration to determine the application thereof against a radially internal surface of the external sleeve.

Still more preferably, shaping of the carcass sleeve comprises: mutually approaching said two lateral half-portions of the forming drum.

Preferably shaping of the carcass sleeve comprises: introducing a fluid through the discontinuous circumferential surface. The fact that the circumferential surface is discontinuous allows more simply designing (with fewer constraints) the channels and/or the devices for flow of air or more generally of gas which performs the function of radially dilating the tyre during shaping.

Preferably the forming drum is transferred from a building station to a shaping station before the positioning of the external sleeve.

In the shaping station, the forming drum receives in engagement an external sleeve integrating the belt structure, preferably already coupled to the tread band. The external sleeve can be previously prepared by means of formation or winding of one or more belt layers adapted to obtain the belt structure on an auxiliary drum and subsequent winding of the tread band on the belt structure carried by the auxiliary drum.

Preferably said semi-finished product is a liner.

Preferably said semi-finished product is a complex. The complex generally comprises liner, under-liner and elongated anti-abrasive elements.

Preferably said devices for building a carcass sleeve comprise devices for coaxially engaging around each of two axially opposite end flaps of said at least one carcass ply each annular anchoring structure so as to build said carcass sleeve.

Preferably devices are provided for positioning an external sleeve comprising at least one belt structure in a coaxially centred position around the carcass sleeve built on said forming drum.

Preferably shaping devices are provided operating on the forming drum for shaping the carcass sleeve according to a toroidal configuration to determine the application thereof against a radially internal surface of the external sleeve.

Preferably, the central sector has a circumferential extension comprised between about $1/15$ and about $1/40$ of a peripheral circumference of the forming drum. Still more preferably it is comprised between about $1/20$ and about $1/30$.

Preferably, the central sector has a circumferential extension comprised between about 30 mm and about 70 mm. Still more preferably it is comprised between about 40 mm and about 60 mm. The ratios and measures claimed allow limiting the abovementioned difference of circumferential extension between the central portion and the lateral half-portions of the forming drum and hence between the central portion and the lateral edges of the semi-finished product in form of a continuous strip wound around the drum, and allow obtaining a correct joint.

Preferably, the central sector is radially more external relative to the lateral half-portions. The lateral half-portions, during the motion of axial sliding away from or approaching each other and with respect to the central sector, slide into a radially more internal position relative to said central sector.

Preferably, the central sector has a thickness comprised between about 1 mm and about 4 mm. Still more preferably it is comprised between about 2 mm and about 3 mm. The central sector comprises preferably a plate, preferably rectangular, preferably having the above-indicated thickness. The plate is arranged in radially more external position relative to the half-portions and has the continuous surface. The aforesaid measures allow limiting the abovementioned difference of circumferential extension between the central portion and the lateral portions of the forming drum and hence between the central portion and the lateral edges of the semi-finished product in form of a continuous strip wound around the drum, and allow obtaining a correct joint.

According to one embodiment, the central sector has devices for retaining the leading end. Such devices are preferably integrated in the central sector.

Preferably, the devices for retaining the leading end comprise at least one suctioning opening terminating on the continuous surface of the central sector. Such devices are inserted in the forming drum and therefore do not constitute an obstruction for the movement of other devices which must operate on the drum itself for building the tyre. Preferably, such devices comprise at least one duct connected to the suctioning opening and obtained in a radial body which is extended from a radially central zone of the drum towards the outside and carries the abovementioned central sector.

Preferably, the devices for retaining the leading end comprise at least one groove obtained in the continuous surface and in fluid communication with the suctioning opening. Preferably, such devices comprise multiple parallel grooves.

Preferably, said at least one groove is substantially extended for the entire axial width of the central sector.

Alternatively, the devices for retaining the leading end can have other types of openings (e.g. holes) uniformly distributed over the entire abovementioned continuous surface.

The suctioning action is in this manner extended over a wide surface of the leading end of the semi-finished product.

According to one embodiment, each of the lateral half-portions comprises an axially external shoulder and a plurality of teeth extending from the shoulder towards the other half-portion; wherein the teeth of a half-portion are circumferentially alternating relative to those of the other half-portion. The teeth allow the two half-portions to partly penetrate each other in a manner so as to be able to move the two shoulders close to or away from each other and relative to the central sector.

Preferably, the continuous surface of the central sector has an axial width equivalent to or greater than the axial distance between the shoulders of the two lateral half-portions. The continuous surface therefore covers the axially central zone of the two half-portions for a circumferentially limited section while the teeth define the radially peripheral surface of the drum for a section complementary to the limited circumferential section.

Preferably, at the central sector, the shoulders lack teeth. In such zone, the teeth are not useful, since the radially peripheral surface of the drum is defined by the continuous surface of the central sector. In addition, the absence of the teeth allows the passage of the structure that carries the central sector and the channels for the suctioning of the air that terminate on the continuous surface.

Preferably, in at least one operating configuration, the teeth of the two half-portions define a discontinuous circumferential surface. Since the teeth of a half-portion (which are inserted between the teeth of the other half-portion) must be able to axially slide with respect to the teeth of said other half-portion, free space remains delimited by the end of each of the teeth of a half-portion and by the two adjacent teeth of the other half-portion. Between the teeth, the gas is preferably made to pass that performs the function of radially dilating the tyre during shaping.

Preferably, the forming drum is radially contractible, in order to allow the removal of the tyre after building.

In one embodiment, each of the lateral half-portions comprises a plurality of radially contractible angular portions.

Preferably, also the central sector is radially contractible. The central sector is extended starting from a radially internal zone of the drum towards the outside and carries the continuous surface in a position which is always radially more external relative to the lateral half-portions. The radial position of the central sector is adjusted as a function of the radial position of the angular portions.

Preferably, the central sector has bevelled axial ends. Each of the two edges of the continuous surface, which are extended parallel to a rotation axis of the forming drum and border the radially peripheral portion of the two lateral half-portions, is connected to said radially peripheral portion. Preferably the connection occurs through a chamfer constituted by a tilted surface, in order to prevent damaging the semi-finished product during its deposition.

Preferably, the apparatus comprises a pressing member operating in thrust relation against the forming drum. Such member serves to force the head of the semi-finished product against the forming drum while the devices for retaining the leading end come into operation, for pressing the joint and welding it.

Preferably, the pressing member is a bar.

Preferably, the pressing member has a contrast surface counter-shaped on the radially external surface of the forming drum placed at the central sector. In such a manner, a uniform pressure is applied along the axial extension of the joint. Preferably, the bar has an axially central part with lesser thickness and axial ends with greater thickness, wherein the difference between the diameters of the thicknesses is equal to the thickness of the central sector (plate) and the axial length of the axially central part is equal to the axial width of the central sector.

In one embodiment, the apparatus also comprises a laying roller, which progressively presses subsequent portions of the semi-finished product during the rotation of the forming drum. The roller rolls on the semi-finished product just after the application of the semi-finished product itself; the roller ensures that the product does not slide circumferentially and it prevents the vacuum applied only to the head from being opposed to said circumferential movement.

Preferably, the apparatus comprises auxiliary support elements removably approachable from axially opposite sides of the forming drum and having respective support surfaces extending on the continuation of the lateral half-portions. This configuration facilitates the application of first components (i.e. the respective semi-finished products) of the carcass sleeve and supports the end flaps of the carcass ply/plies during application on the forming drum.

Preferably, the apparatus further comprises: at least one building station carrying the devices for applying said semi-finished product; a shaping station carrying said shaping devices; devices for transferring the forming drum from said at least one building station to the shaping station.

BRIEF DESCRIPTION OF THE DRAWINGS

Further characteristics and advantages will be clearer from the description of a preferred but not exclusive embodiment of a process and an apparatus for building tyres in accordance with the present invention.

Such description will be set forth hereinbelow with reference to the enclosed drawings, provided only for exemplifying and thus non-limiting purposes, in which:

FIGS. 2a-2d illustrate a half-section according to a radial plane of the forming drum of FIG. 1 in respective operative steps;

FIGS. 3a and 3b illustrate a section according to an equatorial plane of the forming drum of FIG. 1 in respective operative steps;

DETAILED DESCRIPTION OF THE INVENTION

With reference to the abovementioned figures, reference number 1 indicates overall a forming drum belonging to an apparatus for obtaining tyres for vehicle wheels arranged to actuate a process according to the present invention.

Figure 4:
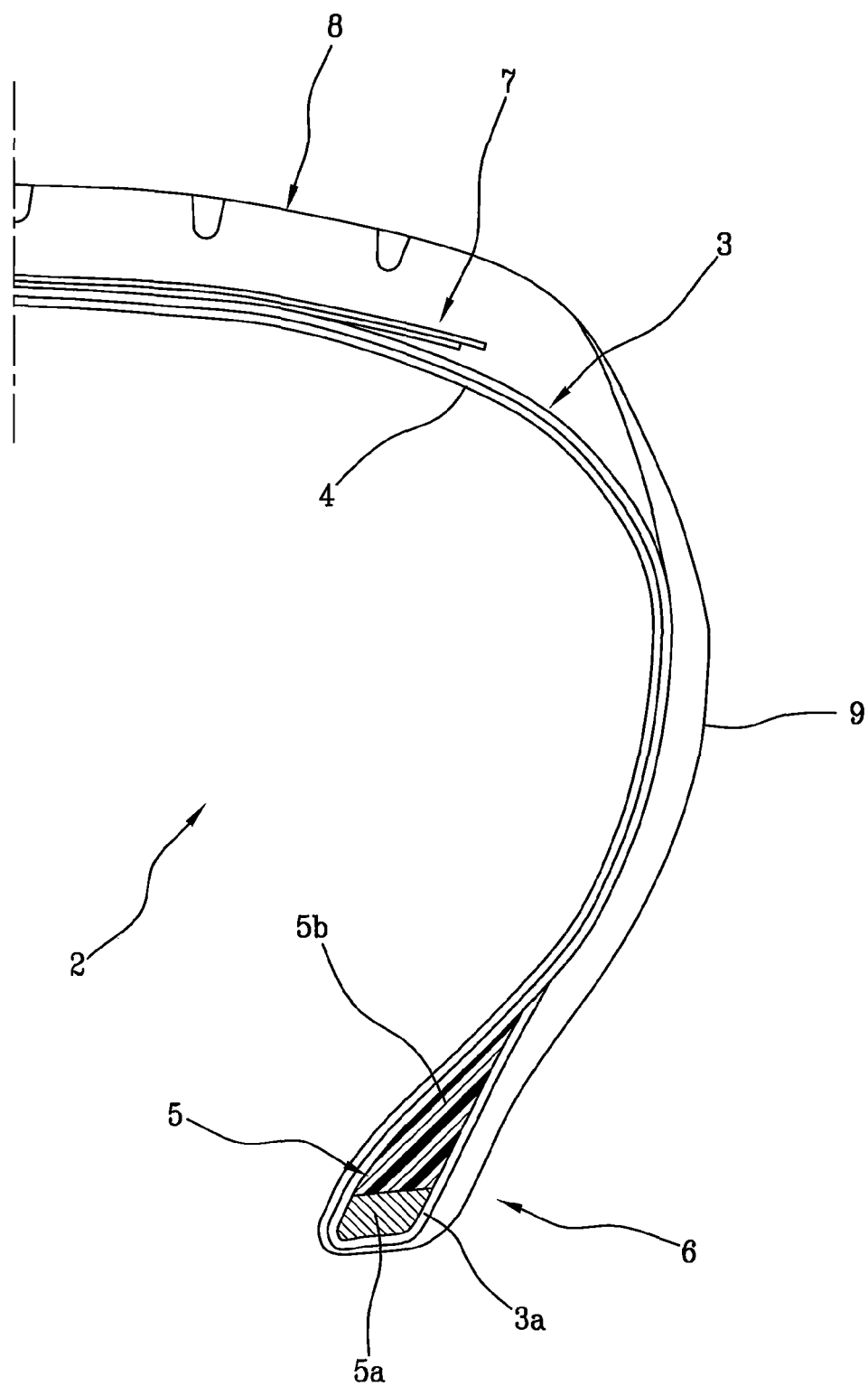
FIG. 4 is a radial half-section of a tyre obtained according to the apparatus and the process of the present invention.

The apparatus is set for obtaining tyres 2 (FIG. 4) essentially comprising at least one carcass ply 3 preferably internally covered with a layer of impermeable elastomeric material or so-called liner 4. Two annular anchoring structures 5, each comprising a so-called bead core 5a carrying an elastomeric filler 5b in radially external position, are engaged with respective end flaps 3a of the carcass plies 3. The annular anchoring structures 5 are integrates in proximity to zones normally identified with the name of "beads" 6, at which the engagement usually occurs between the tyre 2 and a respective mounting rim (not depicted), according to a fitting diameter "D0" determined by the internal diameter size of the annular anchoring structures 5.

A belt structure 7 is circumferentially applied around the carcass ply/plies 3, and a tread band 8 is circumferentially superimposed on the belt structure 7. Two sidewalls 9, each extending from the corresponding bead 6 to a corresponding lateral edge of the tread band 8, are applied in laterally opposite positions on the carcass ply/plies 3.

The forming drum 1 has two lateral half-portions 10 supported by a central shaft (not depicted) extending along a geometric axis "X-X" of the forming drum 1 itself. The lateral half-portions 10 are axially approachable, e.g. on command of a threaded bar operatively arranged inside the central shaft and carrying two threaded portions, respectively right-handed and left-handed, each engaging one of the lateral half-portions 10. The lateral half-portions 10 of the forming drum 1 are consequently induced to simultaneously translate in respectively opposite directions along the central shaft, following rotations imparted to the threaded bar through an actuator operatively couplable at one end of the central shaft.

Each of the lateral half-portions 10 comprises an axially external shoulder 11 and a plurality of teeth 12 which are extended from the shoulder 11 thereof towards the other half-portion 10. The teeth 12 of a half-portion 11 are circumferentially alternating relative to those of the other half-portion 10. In other words, the two lateral half-portions 10 of the building drum 1 are axially extended towards each other with respective mutually penetrating toothing, i.e. wherein the teeth 12 of each toothing are slidably inserted in alternating sequence between the teeth 12 belonging to the other half-portion 10.

Figure 1:
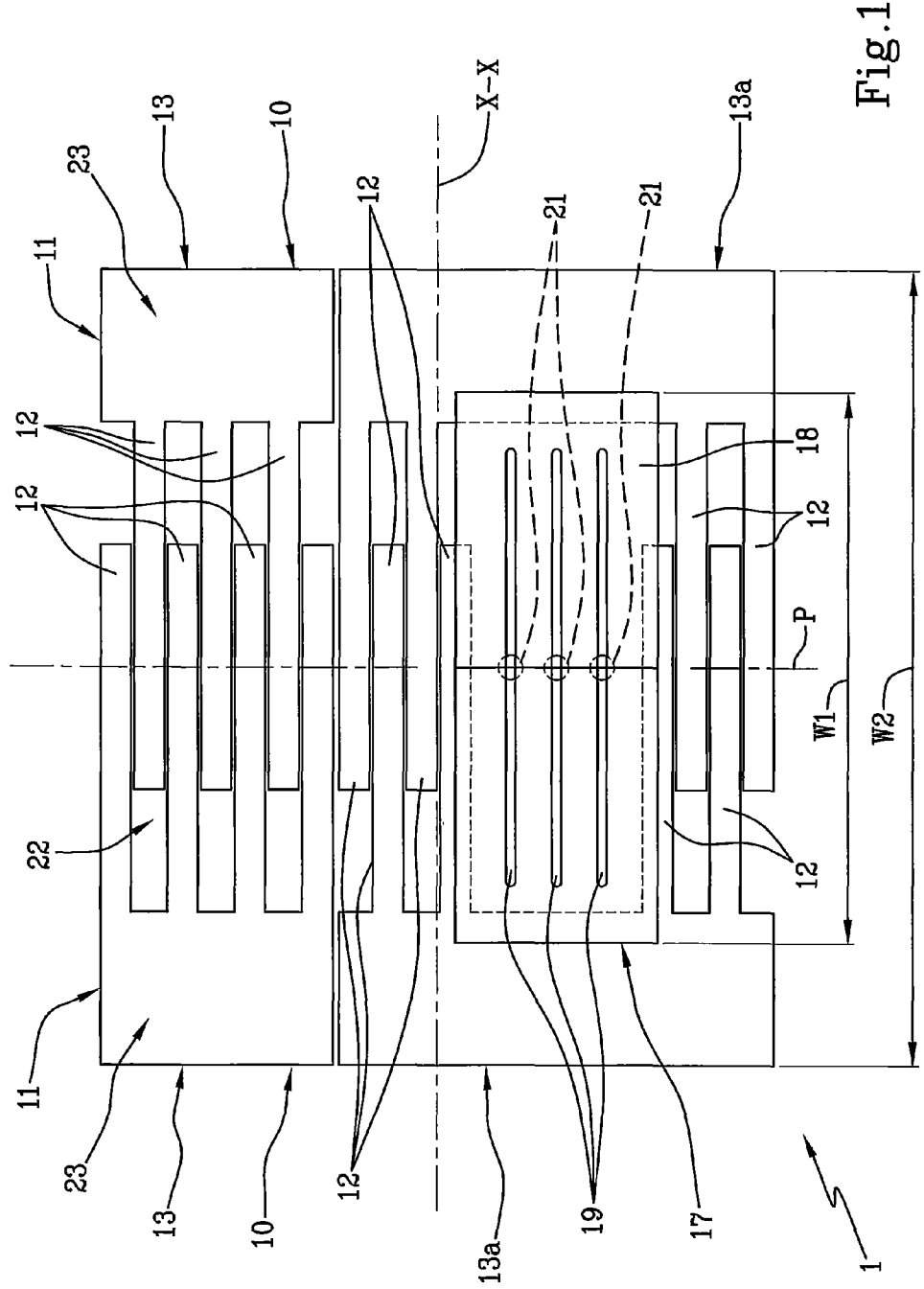
FIG. 1 is a top schematic view of a forming drum belonging to an apparatus according to the present invention.
Figure 2A:
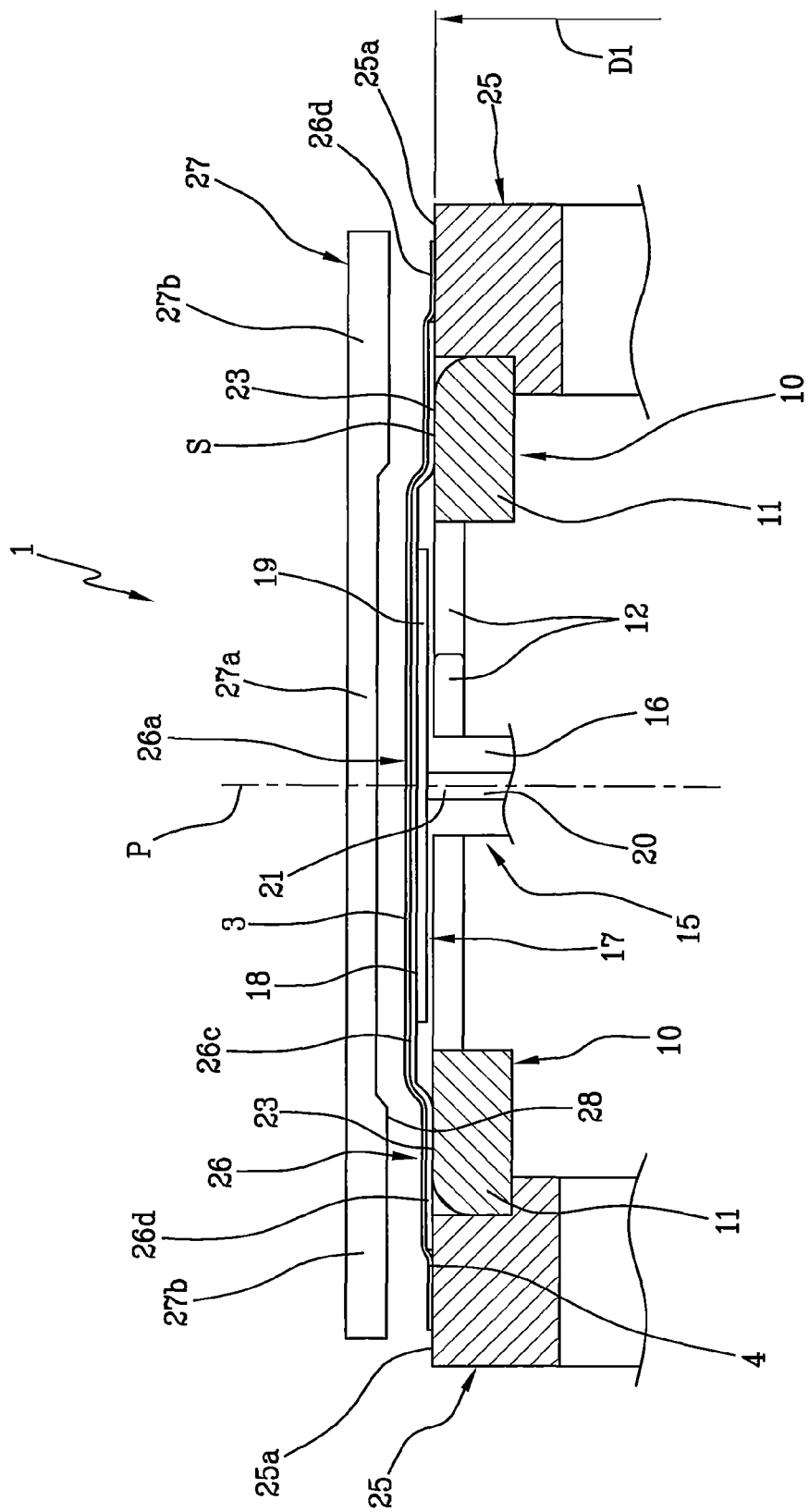
Figure 2B:
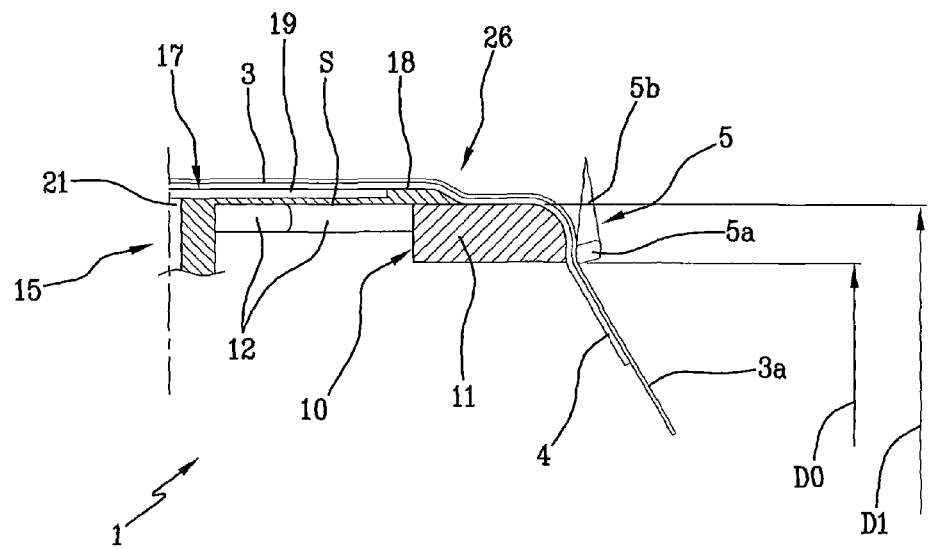
Figure 2C:
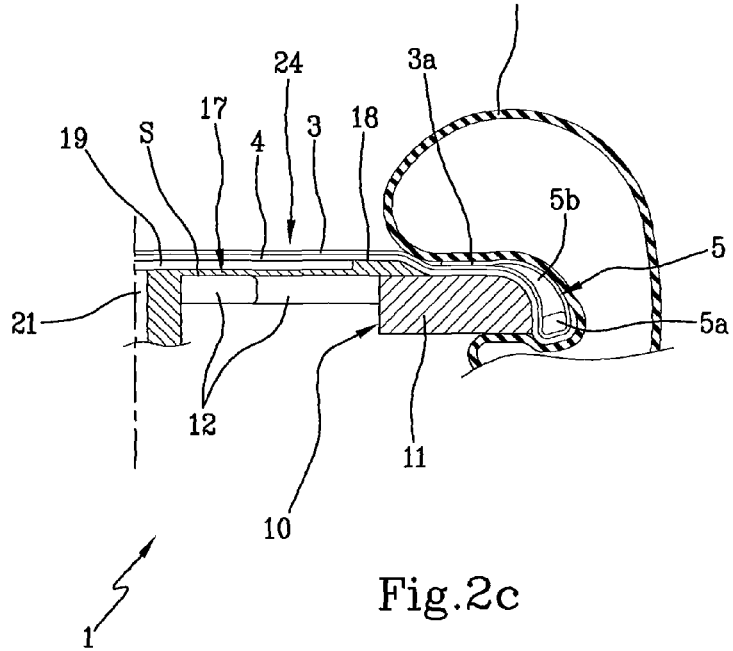

Each of the lateral half-portions 10 consists of respective angular portions 13 (FIGS. 1, 3a and 3b), radially moveable between a rest condition (not illustrated) in which they are brought radially close to the geometric axis "X-X" in order to confer to the forming drum 1 a diameter smaller than the fitting diameter "D0" of the tyre being processed, so as to allow the removal of the built tyre 2 from the forming drum 1 itself, and a work condition in which, as in the enclosed figures, such portions are extended in circumferential continuity relationship so as to form a radially external surface "S", defining an application diameter "D1" significantly greater than the fitting diameter "D0" (FIG. 2b). Adjacent angular portions 13 are mutually coupled on surfaces 14 which are tilted with respect to a radial direction in a manner so as to allow the radial contraction of the forming drum 1. In the illustrated embodiment, each of the lateral half-portions 10 of the forming drum 1 comprises six angular portions 13 (FIGS. 3a and 3b).

The forming drum 1 further comprises a central sector 15 situated at an equatorial plane "P" of the forming drum 1 itself and fixed along an axial direction (parallel to the geometric axis "X-X"). Also the central sector 15 is radially moveable in order to follow the radial movement of the angular portions 13 without interferences.

The central sector 15 is extended only partly along the circumferential extension of the forming drum 1 (FIGS. 1, 3a and 3b) and comprises a radial body 16 which is extended from a radially central zone of the forming drum 1 towards the outside and carries a plate 17 on a radially external end thereof. The lateral half-portions 10, during their translation in opposite directions, slide with respect to the central sector 15.

Each of the angular portions 13 of a lateral half-portion 10 is coupled to an angular portion 13 of the other lateral half-portion 10, in the sense that the respective toothings are mutually penetrating.

The central sector 15 is situated at two angular portions 13a (each belonging to a lateral half-portion 10) making up part of the angular portions 13, coupled and provided with a smaller number of teeth (with respect to the circumferential extension of the respective angular portion 13). The plate 17 is placed in a radially more external position with respect to said angular portions 13a but substantially in contact therewith and hence said angular portions 13a slide below the plate 17.

The plate 17 has a thickness of at most about 4 mm, preferably comprised between about 1 mm and about 4 mm and, still more preferably, it is comprised between about 2 mm and about 3 mm.

The radial body 16 of the central sector 15 passes in the space corresponding to the missing teeth. Each of the angular portions 13, except those associated with the central sector 15, has for example six or seven teeth 12. Each of the two angular portions 13a associated with the central sector 15 instead has, for example, four teeth 12 (FIG. 1) situated two-by-two at opposite sides of the plate 17.

The plate 17 has a radially peripheral continuous surface 18, turned towards the exterior of the forming drum 1, i.e. opposite side with respect to the geometric axis "X-X".

Grooves 19 are present on the radially peripheral continuous surface 18, such grooves parallel to the geometric axis "X-X" and in fluid communication with respective ducts 20, through suction openings 21, obtained in the radial body 16.

The plate 17 (and the continuous surface 18) has a circumferential extension "L" (FIGS. 3a and 3b) comprised between about $\frac{1}{15}$ and about $\frac{1}{40}$ of a peripheral circumference "C" of the forming drum 1. In the illustrated embodiment, the circumferential extension "L" is about ⅟₁₅ of the peripheral circumference "C". For example, the central sector 15 has a circumferential extension "L" comprised between about 30 mm and about 70 mm.

The plate 17 (and the continuous surface 18) has an axial width "W1" (FIG. 1) comprised between about ⅔ and about ⅘ of an axial width "W2" of the forming drum 1 measured when the two lateral half-portions 10 are in the maximum mutual axial approach configuration (maximum penetration between the toothings).

Observing FIG. 1, one therefore notes that the radially external surface "S" of the forming drum 1 in its entirety is formed by the radially peripheral continuous surface 18 and by a radially peripheral portion of the two lateral half-portions 10. The radially peripheral portion of the two lateral half-portions 10 in turn comprises a discontinuous circumferential surface 22 (which constitutes an axially central portion of the two half-portions 10) adjacent to the continuous surface 18 and by two auxiliary continuous surfaces 23 belonging to the axially external shoulders 11 of the two lateral half-portions 10. The discontinuous circumferential surface 22 is formed by the mutually penetrating teeth 12.

The forming drum 1 is adapted to be transferred, by means of transfer devices (not illustrated), to one or more work stations for allowing the execution of various operating steps directed towards the assembly of the tyre 2 being processed.

More particularly, the forming drum 1 is first engaged in a building station in which a so-called carcass sleeve 24 is obtained comprising the carcass ply/plies 3 coupled to the respective annular anchoring structures 5.

The building station is preferably equipped with auxiliary support members 25 (FIG. 2a), obtained for example in the form of two annular elements removably approachable from axially opposite sides of the forming drum 1. The auxiliary support members 25 have respective support surfaces 25a preferably having substantially cylindrical shape, with diameter substantially equal to the application diameter "D1". Once the approaching has occurred, the support surfaces 25a are extended in continuity relationship on the continuation of the radially external surface "S".

In the building station, devices (not depicted) operate for building a carcass sleeve which apply first components of the carcass sleeve 24 at the forming drum 1.

Such devices comprise a dispenser which, in accordance with the process according to the invention, feeds a semi-finished product 26 in form of a continuous strip having axial width according to specifications, previously cut along the circumferential extension of the radially external surface "S" and dispensed towards the latter, while the forming drum 1 rotates around its geometric axis "X-X", so as to cause its winding around the external surface "S" itself.

For such purpose, the forming drum is angularly rotated around its geometric axis "X-X" and arranged in the correct angular position for receiving a leading end 26a of the semi-finished product 26 at the continuous surface 18 (FIG. 3a). The leading end 26a of the semi-finished product 26 is laid on the continuous surface 18 of the forming drum 1 and retained thereto through suctioning of air by the grooves 19 in fluid communication with the suction openings 21 and the ducts 20 connected to suctioning devices, not illustrated.

As illustrated in FIG. 2a, an axially central portion of the leading end 26a rests directly on the continuous surface 18 and lateral portions of the leading end 26a rest on the auxiliary continuous surfaces 23 of the lateral half-portions 10 and on the support surfaces 25a of the auxiliary support members 25.

Through the rotation of the forming drum 1 around its geometric axis "X-X", the semi-finished product 26 in form of a continuous strip cut to size is wound around the radially external surface "S" until it superimposes a trailing end 26b thereof on the leading end 26a (FIG. 3b).

Given the limited thickness and the limited circumferential extension of the plate 17, after the winding, the semi-finished product 26 laid against the forming drum 1 has a difference of circumferential extension between a central portion 26c thereof and lateral portions 26d thereof smaller than about 2 mm, more preferably smaller than about 1 mm. Therefore, the end edges of the leading end 26a and the trailing end 26b are substantially parallel to each other and to the geometric axis "X-X".

A pressing member 27, in the form of a bar, serves to force the leading end 26a on the continuous surface 18 of the forming drum 1 and then to press the trailing end 26b thereof on the leading end 26a and against the forming drum 1, in order to exert a substantially uniform pressure along the entire axial extension of the trailing end 26b and the leading end 26a and firmly and mutually join said ends (FIG. 3b). Preferably, according to the illustrated embodiment, the bar 27 has a contrast surface 28 counter-shaped on the radially external surface of the forming drum 1 placed at the central sector 15. According to that illustrated in FIG. 2a, in a section along a radial plane, the leading end 26a of the semi-finished product 26 follows the shape of the plate 17 (with larger diameter) and the two lateral half-portions 10 (with smaller diameter). The bar 27 has an axially central portion 27a that is recessed with respect to its two end portions 27b. The axially central portion 27a has an axial length substantially equal to the axial width "W1" of the plate 17 and forms a step with its end portions 27b with height substantially equal to the thickness of said plate 17.

In a preferred embodiment, said semi-finished product 26 deposited on the external surface "S" is a "complex" and comprises a first layer (which remains radially more internal after the winding) that constitutes the layer of impermeable elastomeric material or so-called liner 4, a second layer defining an under-liner and a third layer comprising a pair of anti-abrasive elongated elements. The carcass ply/plies 3 is/are subsequently wound in radially external position relative to said complex.

In a different embodiment, said semi-finished product 26 deposited on the radially external surface "S" is the liner 4, under-liner and anti-abrasive elongated elements are separately and subsequently deposited. Then, there is the deposition of the carcass ply/plies 3.

Upon completing the formation of the carcass ply/plies 3, the auxiliary support members 25 are axially moved away from the respective lateral half-portions 10 of the forming drum 1, so as to remove the support surfaces 25a from the liner 4 and from the carcass ply/plies 3. The removal of the support surfaces 25a makes it possible to fold, towards the geometric axis "X-X" of the forming drum 1, the end flaps 3a of the carcass ply/plies 3 applied around the forming drum 1 (FIG. 2b), for example with the aid of rollers or other devices not illustrated since obtainable in any convenient manner.

Devices, not illustrated since obtainable in a per se known manner, provide to fit (position) each of the annular anchoring structures 5 coaxially around one of the end flaps 3a of the carcass ply/plies 3 folded towards the geometric axis "X-X" (FIG. 2b). The internal diameter of the annular anchoring structures 5, defining the aforesaid fitting diameter "D0", is smaller than the diameter of the external surface "S", defining the application diameter "D1" of the carcass ply/plies 3. Consequently, the annular anchoring structures 5 fit on the end flaps 3a are adapted to be positioned in axial abutment relationship, each against a side of the corresponding half-part 10 of the forming drum 1.

Upon completed positioning, small inflatable chambers 29 or other turning up members provide to turn up each of the end flaps 3a around the respective annular anchoring structure 5, so as to stabilize the engagement therewith with the carcass ply/plies 3, determining the formation of the aforesaid carcass sleeve 24.

Upon completed engagement of the annular anchoring structures 5, the application of the sidewalls 9 can be actuated.

The forming drum 1 carrying the carcass sleeve 24 is then transferred from the building station to a shaping station, through transfer devices, in order to receive in engagement an external sleeve 30 integrating the belt structure 7, preferably already coupled to the tread band 8. The previously formed external sleeve is arranged, through positioning devices, in a coaxially centred position around the carcass sleeve 24 carried by the forming drum 1. In the shaping station, shaping devices operate on the forming drum 1 for shaping the carcass sleeve 24 according to a toroidal configuration (FIG. 2d), so as to determine the application thereof against a radially internal surface of the external sleeve 30.

The shaping devices can for example comprise the aforesaid actuator (not depicted) arranged to drive in rotation the threaded bar, in order to cause a mutual axial approaching of the lateral half-portions 10 of the forming drum 1 and, consequently, of the annular anchoring structures 5 of the carcass sleeve 24.

The shaping devices further comprise inflating members having a pneumatic circuit, for feeding an operating fluid into the carcass sleeve 24 and determining the radial expansion thereof through inflation, during the mutual approaching of the annular anchoring structures 5. The operating fluid is introduced through openings in the discontinuous circumferential surface 22 defined by the teeth 12.

Upon completed building, the tyre 2 can be removed from the forming drum 1, upon radial contraction of the latter, in order to be subjected to a step of moulding and curing performable in any convenient manner.

The invention claimed is:

1. A process for manufacturing a tyre comprising: building a carcass sleeve around a forming drum having an application diameter, said carcass sleeve comprising a carcass ply with axially opposite end flaps, each of which is coaxially engaged to an annular anchoring structure defining a fitting diameter smaller than the application diameter, wherein the building of said carcass sleeve comprises:
   providing the drum so that it has two lateral half-portions which are axially moved relative to one another, each lateral half-portion comprising a circumferentially continuous axially outer shoulder and a plurality of teeth which are axially extended from this shoulder towards the other half-portion, the teeth of each half-portion being circumferentially alternating relative to those of the other half-portion so that the teeth of the half-portions mesh with each other and the teeth of each half-portion are slidably inserted in alternating sequence between the teeth belonging to the other half-portion, free spaces which remain by the end of each of the teeth of one of the half-portions and by the two adjacent teeth of the other half-portion providing openings in a discontinuous surface of the drum,
   wherein the drum is further provided with a single plate extending only partly around the circumference of the drum and arranged radially more external relative to the half-portions and providing a continuous surface on the drum such that the continuous surface covers a section of the half-portions and the half-portions slide against the radial interior of the plate as they move axially with respect to one another, the use of the single plate causing the radially peripheral surface of the drum to have the same peripheral diameter, except only for a portion limited to the continuous surface of the drum,
   wherein the step of building the carcass sleeve comprises applying and retaining a leading end of a semi-finished product, which was cut to size from a continuous strip, against the continuous surface of the plate, then rotating the drum so that the cut semi-finished product is wound around the drum until a trailing end of the semi-finished product becomes superimposed on the leading end over the plate while the remaining circumferential portion of the semi-finished product, between the leading and trailing ends, is laid on a central portion of the two lateral half-portions, against the openings;
   after superimposing the leading and trailing ends, pressing the trailing end on the leading end and against the forming drum for mutually joining said leading and trailing ends while the leading end rests against the plate; and
   wherein the lateral half-portions are radially contractible and the radial position of the plate is adjusted as a function of the radial configuration of the half-portions by a radially movable structure arranged between the lateral half-portions such that the plate is always radially more external relative to the half-portions.

2. The process as claimed in claim 1, wherein after the winding, the semi-finished product laid against the forming drum has a difference of circumferential extension between a central portion thereof and lateral portions thereof less than 2 mm.

3. The process as claimed in claim 1, wherein after the winding, the semi-finished product laid against the forming drum has a difference of circumferential extension between a central portion thereof and lateral portions thereof less than 1 mm.

4. The process as claimed in claim 1, wherein after the winding, the leading end and the trailing end of the semi-finished product laid against the forming drum have parallel end edges thereof.

5. The process as claimed in claim 1, comprising:
   exerting a substantially uniform pressure along an entire axial extension of the trailing end and the leading end.

6. The process as claimed in claim 1, wherein during an application of said carcass ply on the forming drum, the end flaps of said carcass ply are supported on respective support surfaces extending on a continuation of the two lateral half-portions of the forming drum.

7. The process as claimed in claim 6, further comprising: removing the support surfaces before turning up each of the axially opposite end flaps of the carcass ply around a respective one of the annular anchoring structures.

8. The process as claimed in claim 1, comprising positioning an external sleeve comprising at least one belt structure in a coaxially centered position around the carcass sleeve built on the forming drum.

9. The process as claimed in claim 8, comprising shaping the carcass sleeve according to a toroidal configuration to achieve application thereof against a radially internal surface of the external sleeve.

10. The process as claimed in claim 9, wherein the shaping of the carcass sleeve comprises: mutually approaching said two lateral half-portions of the forming drum.

11. The process as claimed in claim 9, wherein the shaping of the carcass sleeve comprises: introducing a fluid through the discontinuous surface.

12. The process as claimed in claim 8, wherein the forming drum is transferred from a building station to a shaping station before the positioning of the external sleeve.

13. The process as claimed in claim 1, wherein said semi-finished product is a liner.

14. The process as claimed in claim 1, wherein said semi-finished product is a complex comprising a liner, an under-liner and elongated anti-abrasive elements.

\* \* \* \* \*